May 22, 1962 R. D. MAY 3,035,701
FILTER AND SEPARATOR FOR DEMULSIFIED OIL AND WATER
MIXTURE AND METHOD OF FILTERING AND
SEPARATING SUCH MIXTURES
Filed Sept. 7, 1956 2 Sheets-Sheet 2
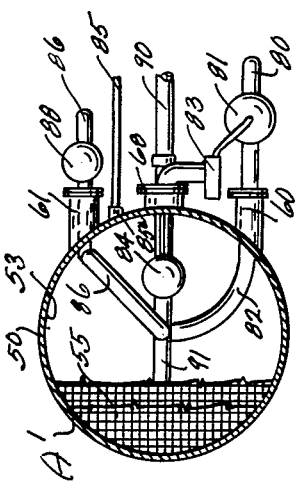
FIG. 4
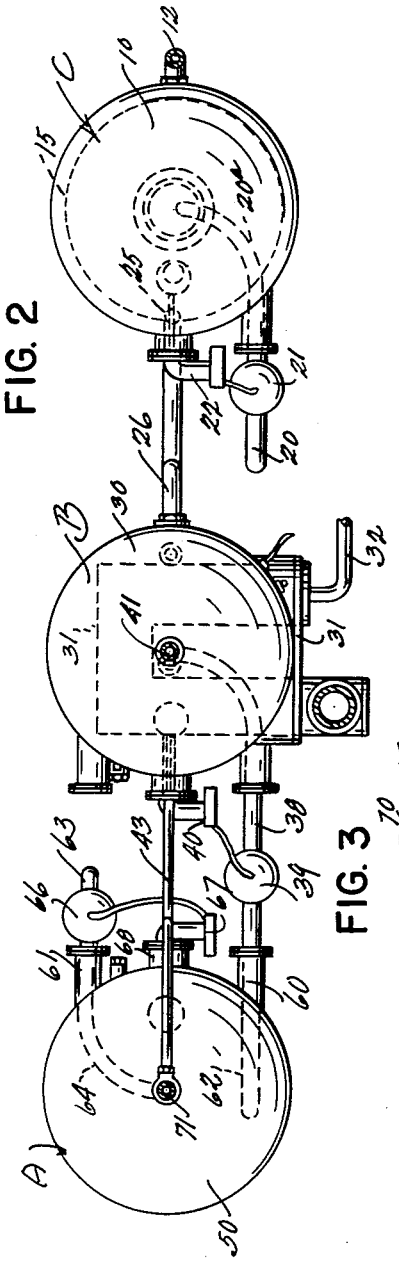
FIG. 2
FIG. 3
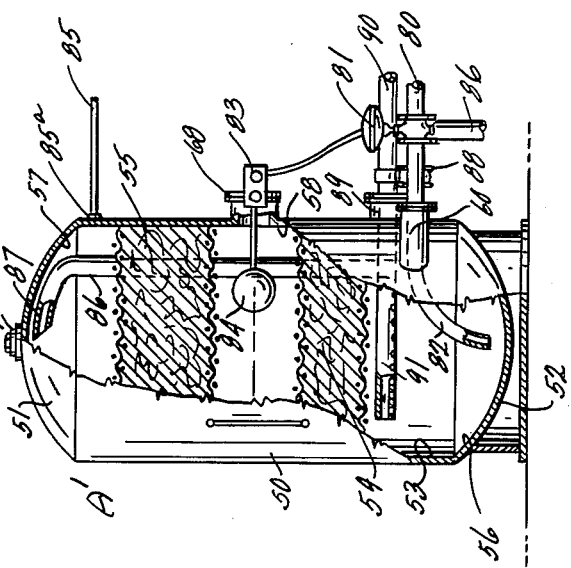
INVENTOR
Russell D. May
BY
ATTORNEYS United States Patent Office 3,035,701
Patented May 22, 1962

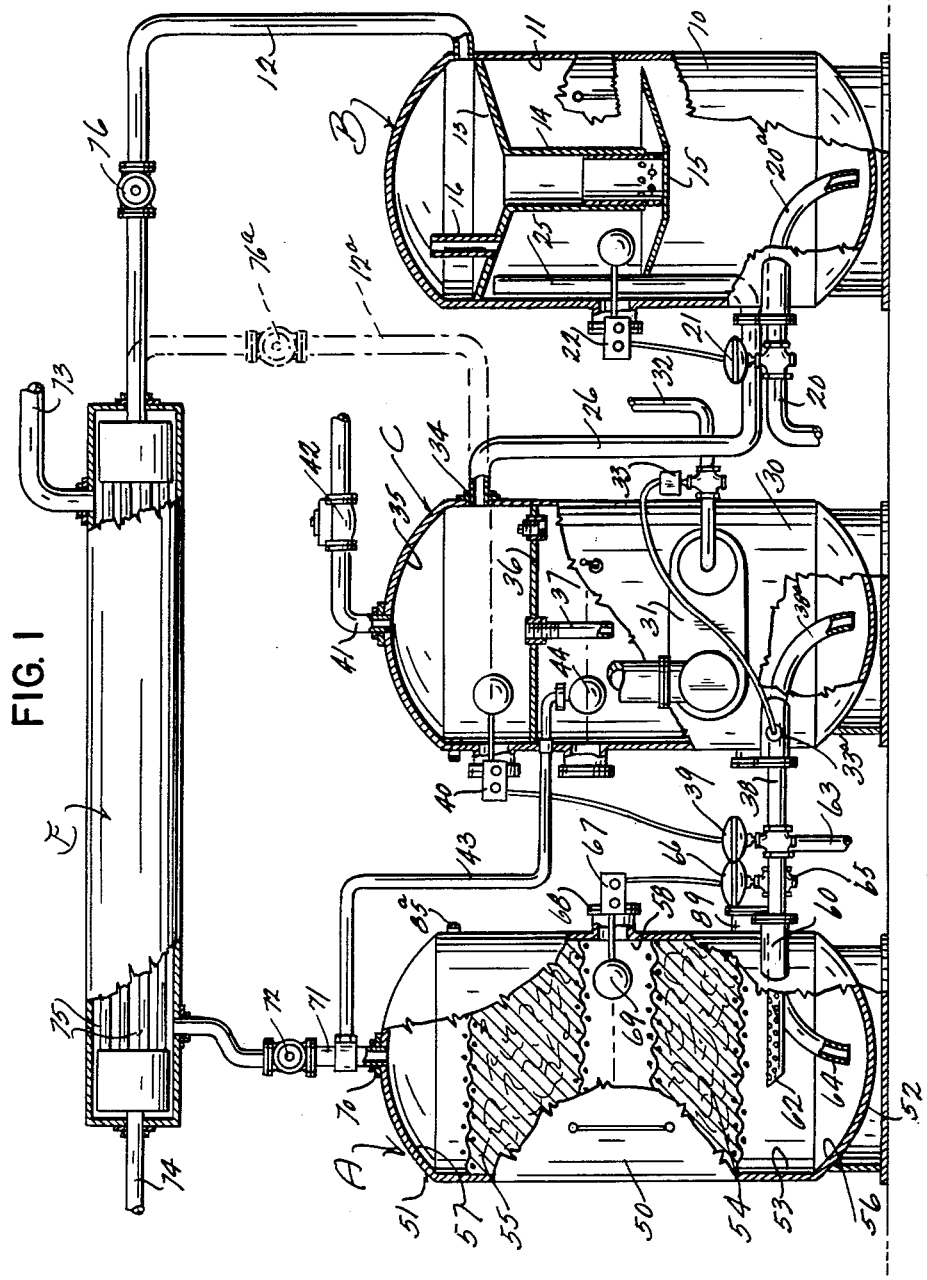

3,035,701
FILTER AND SEPARATOR FOR DEMULSIFIED OIL AND WATER MIXTURE AND METHOD OF FILTERING AND SEPARATING SUCH MIXTURES
Russell Denton May, Tulsa, Okla., assignor, by mesne assignments, to The Youngstown Sheet and Tube Company, Youngstown, Ohio, a corporation of Ohio
Filed Sept. 7, 1956, Ser. No. 608,625
3 Claims. (Cl. 210—114)

This invention relates to improvements in means for the separation of oil, gas and water from petroleum emulsions.

This application is a continuation-in-part out of my co-pending application Serial No. 425,523, filed April 26, 1954, now U.S. Patent 2,864,502, dated December 16, 1958.

The primary object of this invention is the provision of improved filtering and separating means for the efficient separation of the resolved constituents of petroleum oils and water wherein means is provided for obtaining a high grade, high gravity oil.

A further object of this invention is the provision of improved filtering and separating means for use in multiple stage systems for the resolving of petroleum emulsions into their constituent parts under constant hydrostatic pressure.

A further object of this invention is the provision of improved filtering and separating means of one basic form, being so constructed as to be readily adapted to vary the treatment of petroleum emulsions according to the properties thereof.

A further object of this invention is the provision of an improved method of filtering oil and water emulsions.

A further object of this invention is the provision of improved filtering and separating means for resolving petroleum emulsions wherein the constituent parts of the emulsions are delicately controlled under pressure conditions such as will provide for the recovery of high gravity oil, with or without entrained condensed rich vapor ends.

In the drawings wherein similar reference characters refer to like parts of the invention:

FIGURE 1 is a view partly in section and partly diagrammatic, showing one form of my improved filtering and separating means for the treatment of petroleum emulsions together with a conjunctive system in which it may be used.

FIGURE 2 is a fragmentary plan view of my improved filtering and separating means and the conjunctive system illustrated in FIGURE 1.

FIGURE 3 is a fragmentary side elevation, partly in section and partly diagrammatic, of another form of filtering and separating means.

FIGURE 4 is a fragmentary plan view, partly in section and partly diagrammatic of the filtering and separating means of FIGURE 3.

In the drawings, wherein for the purpose of illustration are shown two forms of my improved filtering and separating means, and wherein the structural features of the tank of the filtering and separating means is standardized so as to enable manipulated arrangement of the details thereof for the optimum treatment of emulsified petroleum according to the characteristic parts thereof, the letter A may generally designate my improved filtering and separating means, B and C respectively a free water knockout and heater used in conjunction with the filtering and separating means A in a multiple stage treatment shown in FIGURES 1 and 2. Part of this multiple stage treatment may include a heat exchanger E, which receives the hot demulsified oil from the filtering and separating means A for initially heating the emulsified petroleum to a predetermined temperature which will best serve the purpose of controlling and manipulating the same through the various stage treatments A, B and C, for the most beneficial recovery of the constituent parts.

Referring now to the free water knockout B, more fully described in my U.S. Patent 2,864,502, dated December 16, 1958, the same includes a tank 10 having a chamber 11 therein: The petroleum emulsion enters the tank 10 via the pipe line 12, flows over the partition 13 through the perforation of tube 14 onto a deflector pan or baffle, and thence spills over into the bottom of the chamber 11.

A tube 16 carried by partition 14 enables equalizing of the pressure between the compartments.

The free water separated from the emulsion will flow through the pipe 20; flow being regulated by a dump valve 21 operated by a conventional float type torque tube liquid level control 22. Pipe 20 has a downturned end 20ª in the tank.

This knockout B constitutes the subject matter of another co-pending application Serial No. 608,624, filed September 7, 1956, now Patent No. 2,996,188.

A pipe line 25 is vertically disposed inside of chamber 11, as shown in FIGURE 1, for the outlet of the emulsified oil through the pipe line 26 and into the heater C. This will also serve as an outlet for some of the rich gases given off from the emulsion which will mingle with the petroleum emulsion in flowing therethrough.

Referring now to the heat treating stage C, more fully described in my U.S. Patent 2,864,502, dated December 16, 1958, the same includes a tank 30 of the same size and capacity as the tank 10, supporting a detachable U-shaped heater 31 fed with fuel through pipe 32; the same being controlled by the usual controls at 33 which include a thermostat 33ª operated by the temperature of heated oil and water leaving tank 30.

The pipe line 26 from the free water knockout tank 10 is connected to the tank 30 as at nipple 34 for carrying the emulsified oil and gas into the upper portion 35 of the tank 30. This emulsion will then pass into the lower portion of the tank 30; past the partition 36, through a pipe 37 and contacts the heater 31. It is heated to a temperature sufficient to break the emulsion. The heated and broken emulsion enters the downturned end 38ª and passes through pipe line 38; the flow thereof being regulated by valve 39 which is controlled by a float type torque tube liquid level control 40.

The formation gases that accrue at the top of the tank 30 are carried off through a pipe line 41. A pressure regulating valve 42 is utilized to maintain the desired pressure in the tank 30.

A pipe line 43 equipped with a float valve 44 is provided to carry off the rich gases trapped immediately beneath the partition 36 and they are condensed in the reclaimed oil passing to the heat exchanger for the purpose of raising the oil gravity.

It will be noted that up to this point there is an absolute control of pressures in the free water knockout B and the heater C; the continuous flow treatment taking place in a closed system with the tanks 10 and 30 operating full of fluid at all times, with the exception of gas displacement areas. This back pressure control within the system results in increased gravity of the oil.

It is to be understood that the valves may be regulated so as to insure maintenance of the proper superatmospheric pressures upon the products in the tanks.

The heater of this application and other heaters are set forth in a co-pending application Serial No. 584,818, filed May 14, 1956.

Referring to the filtering and separating sage A, the same includes a tank 50 of the same volumetric capacity as each of the tanks of the stages B and C. This tank has outwardly bulged top and bottom walls 51 and 52. The chamber 53 is provided with a lower primary filter 54 and an upper secondary filter 55 therein, preferably comprising packs of any material found desirable. I have found excelsior to be satisfactory. These filter packs divide the chamber 53 into a lower compartment 56, an upper compartment 57, and an intermediate compartment 58.

The tank 50 is provided with bottom pipe coupling connections 60 and 61, best shown in FIGURE 2, opening into compartment 56, adapted to receive various pipes as described. In the system shown in FIGURES 1 and 2, the pipe 33 leading from the stage C is attached to the coupling connection 60, and extends into the compartment 56 wherein it has a perforated discharge nozzle 62. The other connection 61 receives and supports a water dumping pipe 63 which opens at 64, centrally in the bottom of the compartment 56. This pipe 63 externally of the tank 50 has a dump valve 65 provided with control means 66 operatively connected with a torque tube liquid level control 67 mounted in the coupling connection 68 of the tank 50. This connection 68 is located in the vicinity of the intermediate compartment 58 in order that the float 69 of the control 67 may operate in the compartment 58 at the dividing level of the oil and water as illustrated by the dotted line shown in FIGURE 1; the differences in density of the two liquids operating it for the purpose of dumping free water from the compartment 56, through the line 63.

In the stage A a top nipple 70 of the tank 50 has a pipe line 71 connected to the heat exchange device E. In this line 71 is disposed an expansion and back pressure regulating valve 72 for holding pressures in the stage A at the desired amount, which may vary from 10 to 50 pounds superatmospheric. The rich gases from line 43 are expanded into the oil passing through line 76 at valve 72 for condensing them and lowering the temperature of the oil.

In the filter tank 50 the heat treated oil and water enter the compartment 56 through nozzle 62. The primary filter 54 assists mainly in separating water from oil. It should be mentioned that the filter material is originally soaked in water as an aid to separation. Oil collects in the top of the intermediate compartment 58. What water is still present is filtered out in the secondary filter pack 55. These filters also remove mud and sand, most of it at the primary filter. The emulsion broken product enters the compartment 56 at between 120° F. and 150° F. and loses its heat so that at discharge into the line 71 the recovered oil has a temperature of about 90° F.

The demulsified oil passes into the heat exchanger E via the pipe line 71 and thence out through the outlet 73 to storage. The petroleum emulsion entering the system at 74 passes through the heat exchanger E through the pipes 75; being heated therein by the demulsified product, and thence exits through pressure regulating valve 76 into pipe 12.

It is entirely possible to operate this multiple stage system by having the petroleum emulsion flow directly into the heater C, thus eliminating the free water knock-out B. In that event the line 12a has connection with the heat exchanger E at its discharge end and leads directly to the heater C; as shown in dot and dash lines in FIGURE 1 of the drawings. Pressure regulating valves 76 and 76a will, of course, be used in the lines 12 and 12a to maintain constant hydrostatic pressure and a pressure regulating valve may be provided in line 73 if desired.

The filtering and separating means A¹ shown in FIGURES 3 and 4, is another form of filtering and separating tank that may be used in the multiple stage treatment of petroleum emulsions. It is described in my U. S. Patent 2,864,502, dated December 16, 1958.

In the filtering and separating tank A¹ use is made of a third lower connection 89 in the tank 50, the same being plugged in the filtering and separating tank A¹. This coupling 89 receives a pipe line 90 in tank A¹, leading from the previous stage and extending into the chamber 56, wherein it is provided with a perforated discharge nozzle 91.

The connection 60 receives a discharge line 80 wherein is located a water dump valve 81. This line 80 has an end 82 extending inwardly and curved downwardly to the bottom of the compartment 56 as shown in FIGURE 3. The dump valve 81 is controlled by means of a torque tube liquid level control 83, coupled to the connection 68. Its float 84 is located in the intermediate compartment 58, for operation at the differential density level of the water and oil.

Gas is not vented from the system using the A¹ filter tank. Instead the gases from the previous stage are fed through pipe line 85 through nipple 85a directly into the upper compartment 57, where they are condensed and mixed with the recovered oil.

Discharge of oil from the filtering and separating means A¹ is made through a vertical pipe 86 which extends through the tank 50. It has an end 87 opening in the top compartment 57 centrally thereof. The lower end of this pipe 86 is coupled to the connection 61 and externally of the tank 50 it has a pressure regulating valve 88 (FIGURE 4) for maintaining back pressure in the tank.

It will be seen from the foregoing description that I have provided filtering and separating means wherein the same tank may be used with various internal modifications for a selected treatment of emulsions of varying constituent parts.

I do not wish to be limited to the treatment of petroleum emulsions, as this filtering and separating means may be used for the treatment of various other emulsions. I have used petroleum emulsions as an example through this description for the purpose of clarity.

Various changes in the shape, size and arrangement of parts may be made to the structures herein illustrated and described without departing from the spirit of the invention or scope of the claims.

I claim:

1. In a filtering and separating device for separation of water and oil mixtures, the combination of a tank having a chamber therein, a filter pack in said chamber subdividing said chamber into a lower compartment and and upper compartment, means for admitting combination oil and water mixtures into the lower compartment of the tank under superatmospheric pressure, a water discharge line connected to the tank for withdrawing water from the lower compartment including a valve in the discharge line exterior of the tank, control means carried by the tank for opening and closing the line including means operated by liquid in the tank for actuating the last mentioned valve, means for withdrawing oil from the upper compartment of the tank including an outlet line having a pressure expansion valve therein, and means for releasing into the reclaimed oil of the upper compartment rich gas ends so that when the oil and gas ends are released by the pressure expansion valve the gas ends will condense in the body of reclaimed oil.

2. A filtering and separating system for separation of water and oil mixtures comprising a tank having a chamber therein, relatively spaced filter packs in said chamber subdividing said chamber into an upper compartment above the upper filter pack, an intermediate compartment between said filter packs, and a lower compartment below the lowermost filter pack, means for admitting into the lower compartment oil and water, a discharge line connected with said tank opening into the lower compartment for discharge of water therethrough, a dump valve upon said line for dumping of water from the tank, control means connected to said valve operating at the interface of oil and water in the tank in the intermediate compartment, means for withdrawing reclaimed oil from the upper compartment, an outlet line connected to the tank for flow of the reclaimed oil to exteriorly of the tank, said outlet line having an expansion valve therein to hold the tank chamber and its contents under superatmospheric pressure, whereby upon release of the reclaimed oil through said expansion valve any rich gas ends present will be condensed with the body of reclaimed oil in said outlet line.

3. A system as described in claim 2 in which means is mounted on the tank for admitting an auxiliary supply of rich gas ends to the reclaimed oil at the top of the tank.

References Cited in the file of this patent

UNITED STATES PATENTS

| | | |
|---|---|---|
| 386,402 | Hughes | July 17, 1888 |
| 866,454 | Freiermuth | Sept. 17, 1907 |
| 1,569,695 | Zoul | Jan. 12, 1926 |
| 1,705,370 | Meathers | Mar. 12, 1929 |
| 1,734,834 | Gard | Dec. 17, 1929 |
| 1,778,286 | Anson | Oct. 14, 1930 |
| 1,990,293 | Lerch | Feb. 5, 1935 |
| 2,122,310 | Burt | June 28, 1938 |
| 2,570,977 | Pettefer | Oct. 9, 1951 |
| 2,624,462 | Williams | Jan. 6, 1953 |
| 2,659,488 | Williams | Nov. 17, 1953 |
| 2,766,890 | Kasten | Oct. 16, 1956 |